United States Patent [19]

Leibinger et al.

[11] 4,168,644

[45] Sep. 25, 1979

[54] RECIPROCATING TOOL MACHINE PARTICULARLY FOR STAMPING OR NIBBLING

[75] Inventors: Berthold Leibinger, Gerlingen; Hans Klingel, Moglingen, both of Fed. Rep. of Germany

[73] Assignee: Trumpf Maschinen AG, Switzerland

[21] Appl. No.: 820,832

[22] Filed: Aug. 1, 1977

[30] Foreign Application Priority Data

Aug. 4, 1976 [DE] Fed. Rep. of Germany ....... 2635003

[51] Int. Cl.$^2$ ............................................. B23D 27/00
[52] U.S. Cl. ...................................... 83/573; 72/442; 72/444; 83/563; 83/916; 192/129 B
[58] Field of Search ................... 83/519, 513, 548–552, 83/572, 573, 571, 916, 563; 29/568; 72/442, 444; 192/129 B

[56] References Cited

U.S. PATENT DOCUMENTS

| | | | |
|---|---|---|---|
| 362,566 | 5/1887 | Beaudry | 83/573 |
| 1,971,937 | 8/1934 | Kock | 192/129 B |
| 3,073,024 | 1/1963 | Hutchens et al. | 29/568 |
| 3,449,991 | 6/1969 | Daniels | 83/552 X |
| 3,811,179 | 5/1974 | Anderson | 29/568 |

Primary Examiner—J. M. Meister
Attorney, Agent, or Firm—McGlew and Tuttle

[57] ABSTRACT

A machine, particularly for stamping or nibbling, comprises a reciprocating tool drive having a plurality of tools connected to the drive for selective reciprocation thereof. The drive includes means for stopping at least one of the tools for exchange purposes and a tool-change member is mounted for movement alongside the tool drive and includes a member movable transversely to the reciprocation direction for engaging and removing a tool which is stopped or disconnected from the drive in order to effect an exchange with another tool without stopping the drives of these other tools. The machine also includes means for engaging and moving a workpiece transverse to the reciprocating direction. One or more tools may be exchanged by the use of a movable conveyor magazine which carries a plurality of tool sets along its length which are selectively positionable into alignment with a fluid-pressure operated piston and cylinder combination having means for engaging a tool which is aligned therewith and positioning it in a location for engagement by the reciprocating drive for the tools of the machine.

12 Claims, 4 Drawing Figures

RECIPROCATING TOOL MACHINE PARTICULARLY FOR STAMPING OR NIBBLING

FIELD AND BACKGROUND OF THE INVENTION

This invention relates in general to metal working machines and, in particular, to a new and useful stamping or nibbling machine equipped with a plurality of selectively individually drivable tools.

DESCRIPTION OF THE PRIOR ART

Machines, particularly in the form of so-called turret-type stamping or nibbling machines are known. The various tools which, in the stamping or nibbling machines, are formed of two parts, namely, a die and a punch, are carried by the turret head of such a machine, which, for example, has the shape of a disc. By indexing the turret, the tool necessary for the next working operation is brought into its working position and connected to the drive by suitable means. After the work is done, this tool is disconnected from the drive. The turret is then indexed until the next needed tool comes into the position of the former one. Once it is in this working position, it is also connected to the drive and the operation can be performed.

In principle, the tool change in such turret-type machines is relatively speedy, at least substantially faster than in individual machines where the tool is inserted manually or with the aid of a conventional change mechanism. However, with a frequent tool change, the idle times may add up to an amount which is no longer negligible.

SUMMARY OF THE INVENTION

The present invention is directed to a machine tool in which, under operational conditions which are usual in practice, the time necessary for the tool change is equal to or at least tends to be equal to zero.

To simplify matters, only a "stamping machine" is discussed in the following description, but the invention is not limited to such machines and can be applied to any other kind of machines with a reciprocating tool motion. Analogously, primarily only a "stamping tool" or the moving part thereof, namely, the "punch" will be mentioned. Further, the diction used hereinafter that a tool is "permanently kept in its operating position" means that any tool, in contradistinction to a turret-type machine, always occupies the same location in the machine and need not first be brought into its operating position.

Upon switching off a stamping machine, as a rule, due to provided automatics, the drive stops at an instant at which the punch, or its carrier, is substantially or exactly in its top dead center position. This is preferably also assumed in the inventive machine tool.

At the beginning of machining operations on a workpiece, at least one stamping tool, of course, must be inserted in the inventive machine. As soon as this punch or its carrier is connected through its clutch or coupling to the drive, the punch executes the usual working strokes. While this tool works, further tools can be inserted in one or more additional tool carriers without thereby disturbing or affecting the simultaneous machining of the workpiece. This is possible primarily due to the fact that the tool can be changed transversely to its longitudinal axis and, consequently, there is no need for moving it vertically into the throat space of the machine. This space is occupied only by the workpiece to be machined, which ordinarily makes the removal of the punch downwardly and the lifting of the die impossible. In order to minimize the size of the machine tool, designers are anxious, of course, to dispose the punches or tool carriers as close to each other as possible. In spite of this, there is always a definite lateral spacing between the two, or if a plurality is provided, between the individual tool carriers. As soon as the work with the first tool is terminated and the workpiece is to be machined with the next tool which, as mentioned, has been inserted in the meantime (or was already inserted at the start of the operation), this lateral spacing between the tools working immediately one after the other must now be taken into account for the displacement of the workpiece. This is done by the positioner compensating for the spacing. Normally, the first tool works at a location of the workpiece and the second tool works at a second location. Thus, a displacement of the workpiece is necessary in any case. In addition to this displacement, however, the lateral spacing of the tools working in succession must also be considered. The distance to be covered in conventional stamping machines may thereby be shortened or extended.

While the second tool is working, the first one may be exchanged for another tool. When more than two connectable tool carriers are provided in the inventive machine tool, it will be common practice, after terminating the operation with the second tool, first to use the third and perhaps further tools and only then to return again to the first tool carrier. Even in individual machines having a single tool carrier, the workpiece must be displaced, if a machining with two different tools at two locations paced from each other is provided. In such cases, however, the machining cannot be continued prior to effecting the tool change. On the contrary, in the inventive machine tool, the tool change can be effected while the first tool is still working, eliminating the waiting time which is unavoidable in individual machines. On the other hand, the lateral spacing of adjacent punches may lead to either a shortening or an extension of the distance of displacement between two working operations, whereby, the time necessary for the displacement of the workpiece is also either reduced or extended. Thus, considering the average, no additional time is lost in the inventive machine. It is true that the individual stamping stroke is executed relatively rapidly, but as a rule, a stamping tool executes a plurality of strokes, so that its working time is sufficiently long to ensure the full advantage of the invention, namely, the elimination of the time loss during the tool change, even in a machine tool having only two tool carriers.

Advantageously, the directions of motion of the tools, or stamping or nibbling punches, are parallel to each other and the tool carriers are mounted on the machine tool at laterally spaced locations. Three or more tool carriers are preferably disposed along a straight line. A development of the invention provides a drive comprising an eccentric shaft and a common connecting rod for all of the tools or tool carriers, and couplings between the connecting rod and each of the associated tools or tool carriers. Consequently, up to the connecting rod, the expenses of the machine are no higher than that of an individual machine. As far as no automatics are provided for moving the working table or the like, the displacement necessary because of the lateral spacing of the punches can be effected in a simple manner, for example, by means of a two-part table and a positioning pin and two or more positioning bores which are provided in the other part of the table with a spacing corresponding to that of the punches. For this displacement then, there is no need for actuating the normal positioning mechanism of the workpiece. With an automatic displacement of the table, the expenses due to the lateral spacing of the punches are negligible.

In a preferred embodiment of the invention, each coupling is designed as a switchable hydraulic coupling device. A further development of the invention provides that each coupling device comprises a working piston which is pivotally mounted on the connecting rod and displaceable within a working cylinder, and a drive piston which is firmly connected to the tool or tool carrier and displaceable within a drive cylinder, and that the partial cylinder spaced limited by the two free piston surfaces are hydraulically connected to each other and this hydraulic connection can be shut off. The connecting rod drives all of the working pistons continuously. However, the motion of each working piston can be transmitted to the associated drive piston only if the hydraulic fluid occupying the space therebetween is prevented from escaping and the hydraulic connection between the cylinders is cleared. If this connection is shut off, it must be ensured that the continuously driven working piston will be displaced to take in the hydraulic fluid as far as is necessary.

Another embodiment of the invention provides that each hydraulic coupling device comprises a working piston which is pivotally mounted on the connecting rod and displaceable within a working cylinder, and a drive piston which is firmly connected to the tool or tool carrier and displaceable within a drive cylinder, and that the working cylinder and the drive cylinder are united to a common coupling device cylinder. Such a common cylinder is a very rugged structure which also is less expensive in manufacture than two separate cylinders.

In addition, there is no need for a connecting line between two separate cylinders. In order to couple the punch to the working piston, it is sufficient to shut off or clear a line for the hydraulic fluid opening into the partial cylinder space between the pistons. Suitable means must be provided, of course, to prevent the occurrence of more than one shut-off member being simultaneously brought into a closing position, which would mean that more than one punch is driven at the same time. Care must also be taken that no harmful excess pressures or underpressures in the hydraulic system are produced while a tool is stopped.

Another embodiment of the invention provides that each coupling device cylinder is associated with a four-way valve having a transverse free passage which is connected, on the one hand, to the central cylinder space between the two free piston surfaces and, on the other hand, to an oil tank, and having a longitudinal free passage hydraulically communicating with the two partial cylinder spaces through which the piston rods extend. Also, a further hydraulic connection is established between the partial cylinder space through which the piston rod of the working piston extends and the transverse connection between the four-way valve and the central cylinder space.

In accordance with one of the features of the invention, the punches or tools are inserted in and removed from the machine tool in a direction which is transverse, particularly perpendicular, to the longitudinal axis, and thereby, also to the motion of the tool. For this purpose, the stamping or nibbling machine is equipped with a correspondingly shaped tool carrier or mount. In this carrier, the tool must be coupled to the drive, which as usual, is done automatically with the insertion. In addition, a locking mechanism is necessary to prevent the tool from coming loose during the working operation or from moving relative to its carrier. With a transverse change, this securing mechanism may comprise, for example, a slider which can be introduced in the axial direction. Rotation may be prevented, for example, by a corresponding design of the shank.

In accordance with a further development of the invention, it is provided that each locking mechanism for each tool may be disengaged only if the coupling is disengaged. A suitable mechanical, electrical, or otherwise operating device prevents the opening of the locking mechanism as long as the coupling is engaged. With the coupling disengaged, the punch is uncoupled from the drive of the stamping machine and occupies, as already mentioned above, a quite definite position, usually, the top dead center position. Because of this positive cooperation between the coupling and locking mechanisms and also because the punch is always at the same definite position at standstill, the machine tool may very advantageously be equipped with an automatic tool change device. This device must be designed for a selective and, as far as possible, also automatic association with the respective tool which is standing still. Instead of a movable tool change device, a double or multiple change device may also be provided, in accordance with the maximum number of tools which are to be received in the machine simultaneously. The tool change device is advantageously mounted between the machine tool and a tool magazine, particularly a two-part magazine, from where the tools are removed, and into which they are returned again after use.

In accordance with a still further development of the invention, the machine tool is designed as a coordinate stamping or nibbling machine with numerical control, in which the positioner is connected to the numerical control. Now, as soon as the first punch has terminated its last working stroke, this numerical control provides for an automatic uncoupling of the first punch and coupling of the second punch. Prior to this, the workpiece is brought into its new position. During the displacement of the workpiece, the numerical control automatically takes into account that the second tool is spaced from the first one by a definite lateral distance. While preparing the program, the lateral spacing of the two consecutively working tools from each other is included into the computation of travel distance from one working position of the workpiece into the next working position.

The use of a numerical or other control offers in addition the advantageous possibility that by dialing a tool carrier, a corresponding command signal of the positioner is produced. In other words, through a numerical control or automatic control of the inventive machine tool, the correct positioning of the workpiece can be effected and, in addition, the lateral displacement can be accommodated while changing from the one tool to the other. Moreover, it is possible to "switch" from one tool to the other. In the described hydraulic coupling, this is done, for example, by actuating at least one of the electro-hydraulic valves in the hydraulic system of each tool.

Accordingly, it is an object of the invention to provide an improved machine, particularly a stamping or nibbling machine, which comprises a reciprocating tool drive having means for connecting a plurality of tools thereto for selective reciprocation and for selective stopping of the tools for changing purposes, and includes a tool change member which is mounted alongside the tool drive and has a member which is movable transversely to the tool drive for engaging and removing a tool therefrom to effect the changing of the tool with another tool and its replacement back into the drive.

A further object of the invention is to provide a reciprocating tool machine, particularly for stamping or nibbling, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
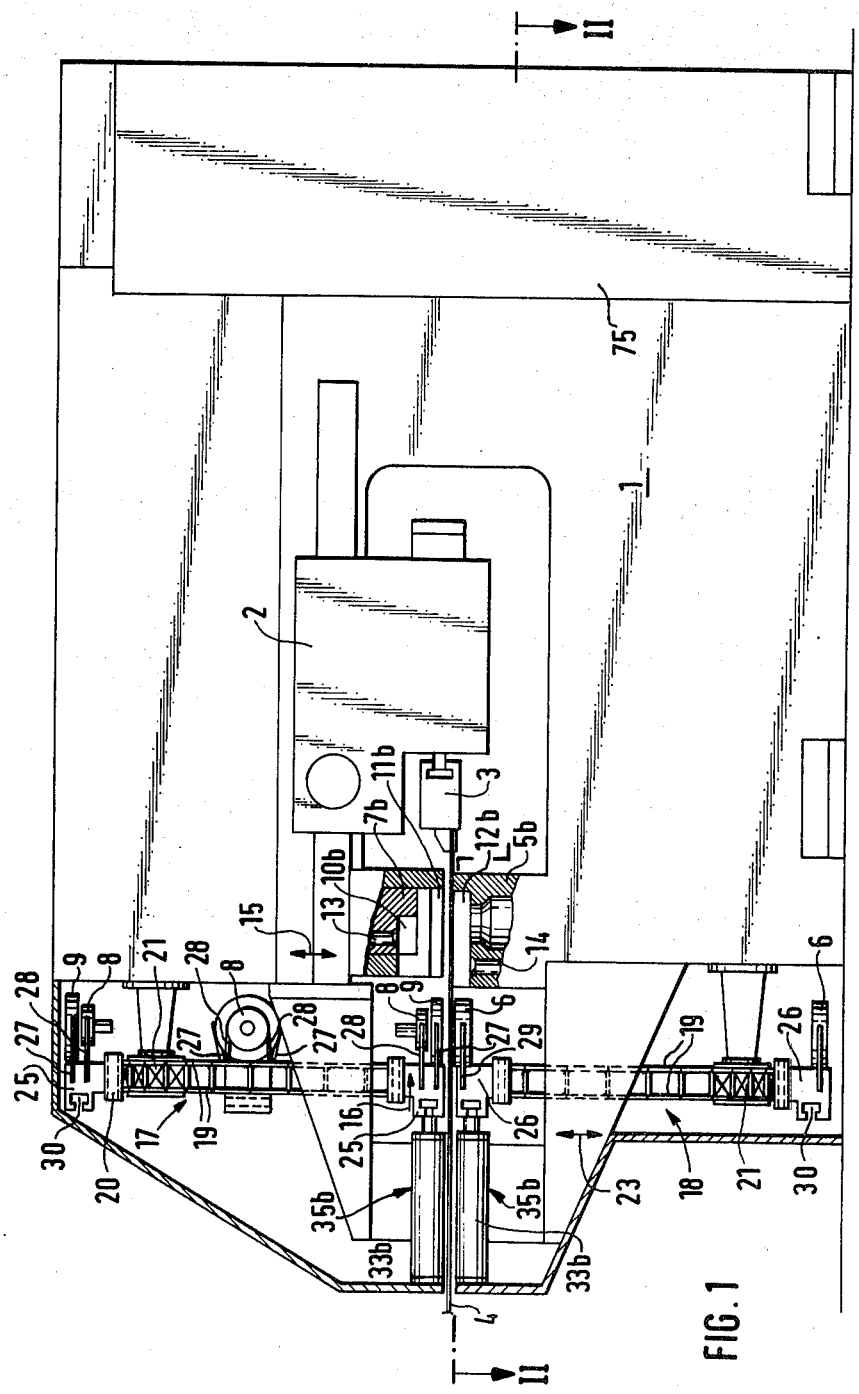
FIG. 1 is a side elevational view of a stamping or nibbling machine, constructed in accordance with the invention.

Referring to the drawings in particular, the invention embodied therein, comprises a machine which, in the embodiment illustrated, comprises a stamping machine 1, which includes an upper set of tools 8 and 9 and a lower cooperating set 6 which are engageable into the machine so as to be aligned in a reciprocating tool drive which moves the tool in the direction of the arrow 15 for engagement with a workpiece 4 which is movable selectively in a plane transversely to the reciprocation of the tools by a workpiece guiding system 2 acting through the workpiece by means of engagement claws 3.

In the embodiment shown, the machine tool is designed as a stamping machine 1. The machine comprises a coordinate guiding system 2 with claws 3 for holding fast a workpiece 4 which, as a rule, is a flat metal sheet. The mode of operation of both the coordinate system and of the claws is well known and there is no need for an explanation in more detail in this respect.

The stamping machine is equipped with a plurality of selectively and individually drivable tools which, in a stamping machine, comprise at least one punch and one die, and in the example shown, includes a stripper in addition. Of course, the die is fixed while the punch reciprocates up and down in a well known manner. In the embodiments shown, the stamping machine is designed as a so-called twin machine, but it could also be a triplet or multiple machine. Since, in accordance with the invention, each tool or tool carrier is permanently kept in its operating postion, the machine must be equipped with more than one tool carrier. Thus, the stamping machine is capable of simultaneously receiving two complete stamping tools.

Each of a pair of lower tool carriers 5a and 5b receive a counter-tool or die 6. In each of the upper tool carriers 7a and 7b, a punch 8 and preferably also a stripper 9, is inserted. In order to permit an insertion or removal of the tools into or from the upper and lower carriers, in a transverse direction, particularly perpendicular to their longitudinal axis, both the upper and the lower tool carriers are open not only downwardly, but also at their edges to the left side, as viewed in FIG. 1. A recess 10a, 10b is provided for receiving punch 8. Recesses 11a, 11b, and 12a, 12b, respectively, are provided in the upper tool carriers 7a and 7b and the lower tool carriers 5a and 5b, and each receive a stripper 9 and a die 6. The punches 8 are clamped in their carriers by means of a locking bolt 13, and the dies 6 by means of a locking bolt 14. The locking bolts 14 are movable up and down as indicated by the double arrow 15. The inserting motion is indicated in FIG. 1 by an arrow 16 and the removal takes place in the opposite direction.

Figure 2:
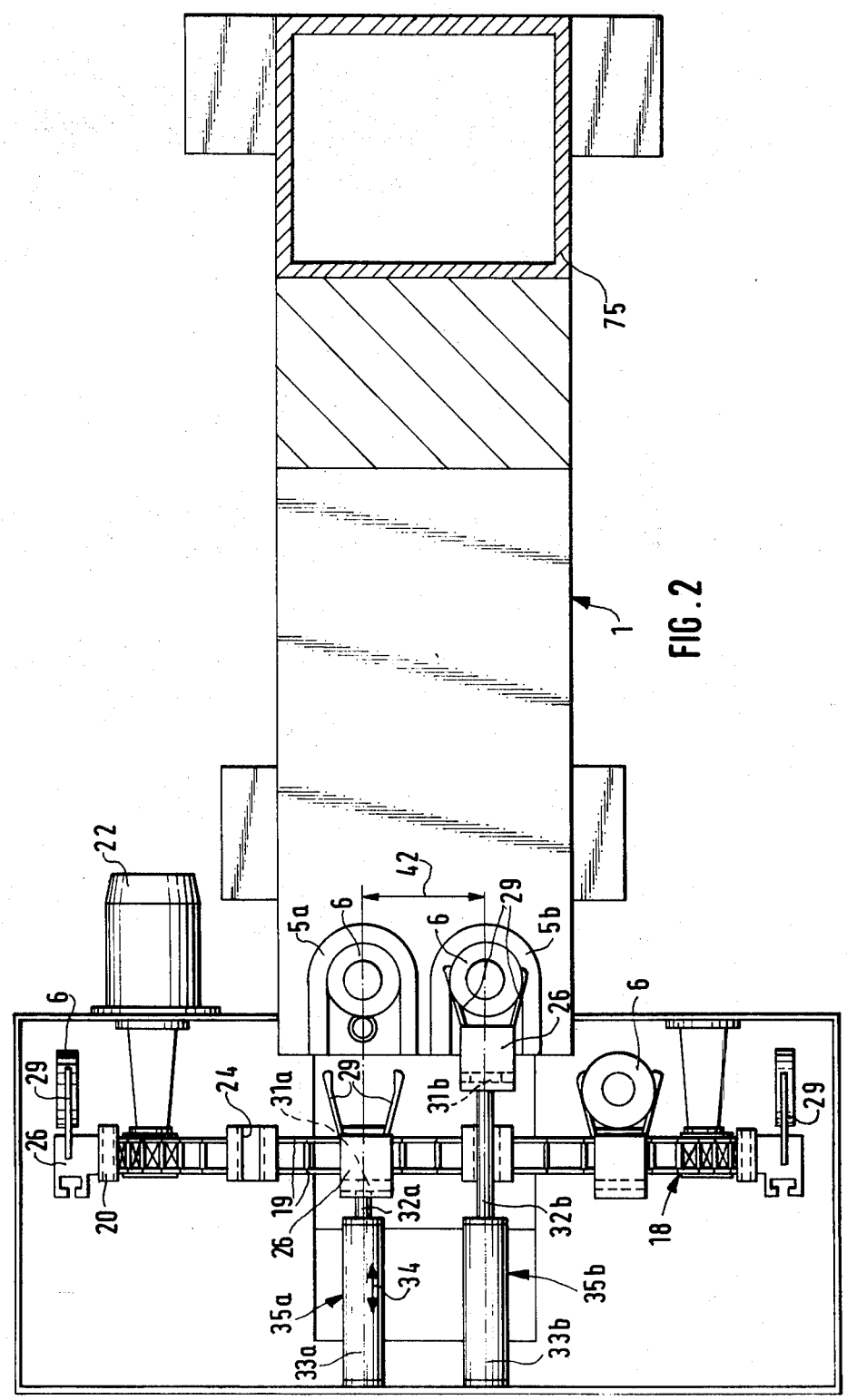
FIG. 2 is a section taken along the line II—II of FIG. 1.

The tools may be changed manually or, in a very advantageous manner, by means of a change device. In the embodiment of FIGS. 1 and 2, a change device is shown by which the tool is removed from an upper magazine 17 and a lower magazine 18 and brought back again after use.

The two magazines 17 and 18 each comprise one or two chains 19 equipped with special clips 20. The chains of the upper and lower magazines each run over four sprocket wheels 21 which are mounted, for example, in the corners of the magazine. One of these four sprocket wheels 21 is driven by a motor 22 which can be both switched and controlled. The motor 22 is capable of running in either direction, so that chains 19 can move in the directions of double arrow 23. In this way, while changing the tools, the shortest run of chains 19 can always be selected.

Clips 20 are provided with a T-shaped groove 24 and, in each of these grooves, slide cassettes 25 and 26 or the like are retained. Each slide cassette 25 is equipped with two pairs of grippers 27 and 28 which, in the working position, extend one over the other. Each of the pairs of grippers 27 engages on a stripper 9, while gripper pairs 28 each serve to hold fast a punch 8. Slide cassettes 26 are equipped with a pair of grippers 29 so that each retains a die 6.

Each slide cassette 25 and 26 is provided with a T-shaped groove 30 at its end remote from the pairs of grippers for coupling engagement with a correspondingly dimensioned and shaped free end 31a, 31b of a piston rod 32a, 32b.

Piston rods 32a, 32b are connected to pistons (not shown) which are displaceable in hydraulic or pneumatic cylinders 33a, 33b in the directions of double arrow 34. Each tool carrier is associated with two hydraulic or pneumatic tool change devices 35a and 35b, which are disposed one above the other (FIG. 1) and each comprises a piston and a cylinder. To obtain a simultaneous insertion and removal of the whole set of stamping tools 6, 8 and 9, and to prevent an incorrect combination of tool parts thereby, the upper and lower magazines are driven conjointly and at the same speed, and, as to the associated sides of the chains, in the same direction. In addition, and for the same reason, the tool change devices 35a and 35b may be actuated simultaneously and in the same direction. It may be learned from FIG. 1 that slide cassettes 25 and 26 are automatically coupled to their tool change device 35a, 35b in the transfer position. The uncoupling is also effected automatically while the chains are driven. Upon insertion of the tool, the empty slide cassettes 25 and 26 are again retracted.

This operation takes place after the tool has been locked in place. While the tool of the first station is working, a tool change can be effected in a second, or even further, station or stations, without disturbing the work at the first station thereby. Of course, the same applies also to the tool change of the first station, as this station is uncoupled from the machine drive and the second or another tool is working. The advantage of this design is that, after termination of the working time of one tool, the work can continue instantly with another tool without losing time with the tool change. Incidentally, with an automatic tool change, the tool change device must be designed correspondingly, preferably in two parts, so that the throat space of the machine and the adjacent space for moving the workpiece always remains free.

Figure 3:
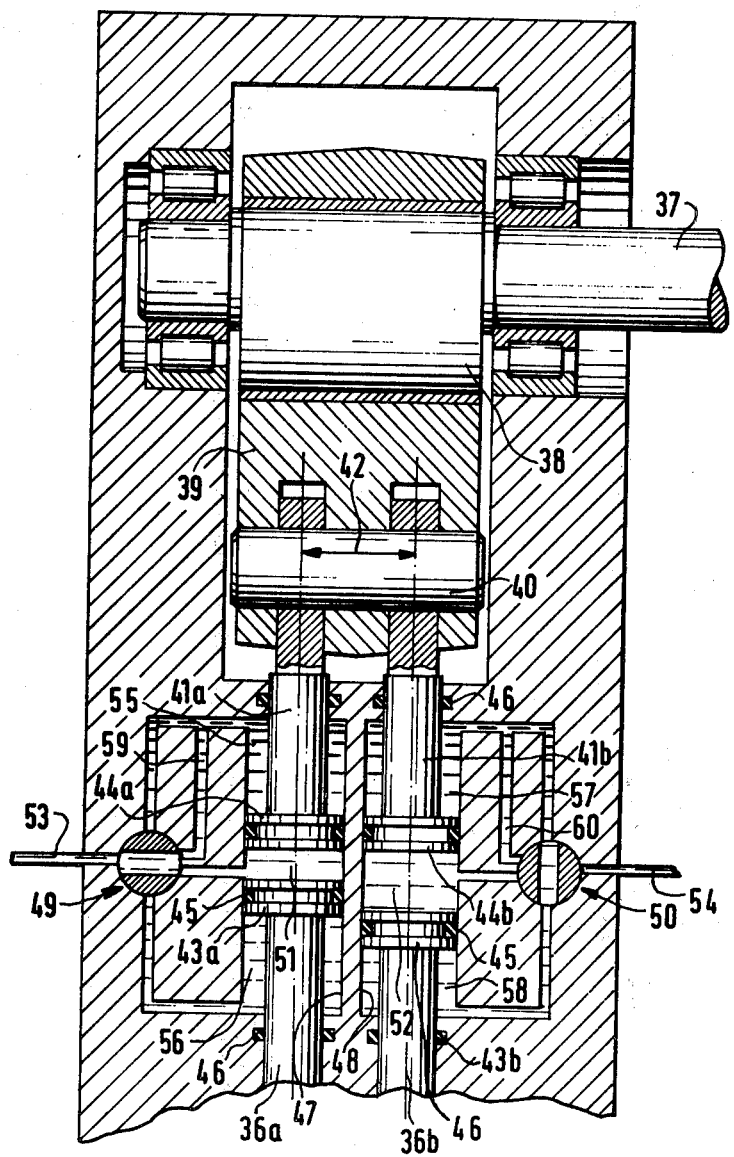
FIG. 3 is an enlarged sectional view of a part of the reciprocating tool drive.

Each of the upper tool carriers 7a and 7b is firmly connected to a ram 36a, 36b and thus follows the motion of the ram as long as the ram is coupled to the drive of the stamping machine. In the embodiment of FIG. 3, a single connection drive is provided. This connection drive is designed in a well known manner and comprises, for example, an electromotor (not shown). This motor drives an eccentric shaft 37, the eccentric 38 of which is seated in a common connecting member 39. Two parallel extending connecting rods 41a and 41b are mounted on a pin 40 of the connecting member 39, however, in contradistinction to conventional machines. Their lateral spacing 42 corresponds to that of the rams 36a and 36b. In addition, connecting rod 41a and ram 36a, as well as connecting rod 41b and ram 36b are coaxially aligned with each other. On the free ends of both rams 36a and 36b and connecting rods 41a and 41b, pistons 43a and 43b and 44a and 44b, respectively, are provided, in particular, formed thereon. Each piston 43a and 43b is provided with at least one piston ring 45 and, in addition, both of the rams 36a and 36b and the connecting rods 41a and 41b are sealed against the housing by means of at least one gasket, preferably an O-ring 46.

Working piston 44a and drive piston 43a are movable up and down in a common coupling device cylinder 47, and working piston 44b and drive piston 43b are movable up and down in a common coupling device cylinder 48. Each coupling device cylinder 47 and 48 is associated with a four-way valve 49 and 50, respectively. The transverse free passage of each of the four-way valves is connected to the central cylinder space 51 and 52, formed between the two free piston surfaces and to a line 53 and 54 leading to an oil tank (not shown). The longitudinal free passage of four-way valve 49 provides the hydraulic connection between the cylinder spaces 55, 56, while the longitudinal free passage of four-way valve 50 provides the hydraulic connection between the cylinder spaces 57 and 58. Another hydraulic connection is established between the partial cylinder space 55 through which the working piston rod or connecting rod 41a extends and the transverse connection between the four-way valve 49 and the central cylinder space 51. The same applies analogously to four-way valve 50 and partial cylinder space 57. These further hydraulic connections are designated 59 and 60.

In FIG. 3, the transverse free passage of four-way valve 49 is open, while the four-way valve 50 is closed. Consequently, the fluid present in central cylinder space 52, for example hydraulic oil, cannot escape. Since working pistons 44a, 44b are continuously reciprocated by connecting member 39, a hydraulic coupling is established between drive piston 43b and working piston 44b, i.e., both pistons are reciprocated simultaneously up and down. Thereby, the punch connected to ram 36b is also moved up and down and executes working strokes.

Since the transverse free passage of four-way valve 49 is open, the reciprocating motion of working piston 44a is not transmitted to drive piston 43a and, consequently, the punch of ram 36a stands still, and therefore, may be easily exchanged. Suitable means, known per se, ensure that upon stopping of their tools, working pistons 43a, 43b always go into their top dead center position.

If piston 43a stands still and piston 44a moves up and down, the volumes of central cylinder space 51 and partial cylinder space 55 vary accordingly. A balancing of the displaced and taken-in fluid takes place through the further hydraulic connecting line 59. The same applies analogously to the righthand part of FIG. 3. Upon the shutting off of the transverse free passage, the hydraulic connection between the central cylinder space and the upper partial cylinder space through the further hydraulic connecting line is interrupted.

Figure 4:
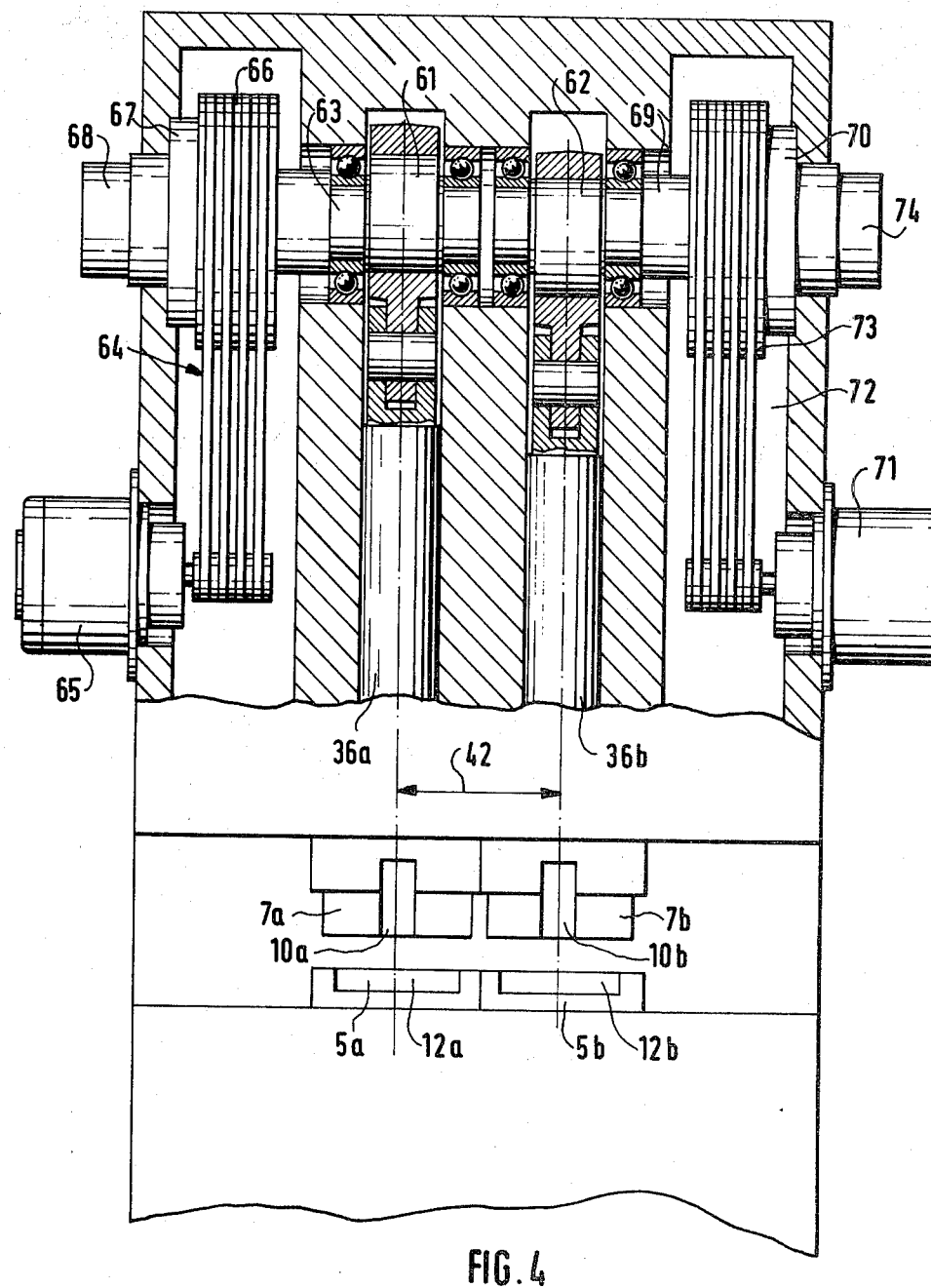
FIG. 4 is a view similar to FIG. 3 of another embodiment of tool drive.

In the embodiment of FIG. 4, each ram 36a, 36b is mounted on a separate eccentric 61, 62, respectively. Eccentric shaft 63 of eccentric 61 is connectable, through a belt transmission 64, to a drive motor 65. The flywheel 66 of the belt transmission 64 is connectable, through a clutch 67 and a control device 68, to eccentric shaft 63, and can be disengaged therefrom again. Consequently, in this variation also, the motor can be driven continuously, while the stamping tool executes working strokes only as long as the coupling device or clutch 67 is engaged or closed.

The engaging and disengaging of the coupling is effected through a control device 68. In the same manner, eccentric shaft 69 of eccentric 62 is connectable, through a clutch 70, to, for example, an electrical drive motor 71. The respective belt transmission is designated 72, the flywheel 73, and the control device 74. With a corresponding design of the control devices and, if provided, of a control device controlling all functions of this machine tool, it may be ensured that only one of the two clutches 67, 70 is engaged each time. Analogously, the same applies to machines having more than two tool carriers.

On the other hand, both embodiments of the machine make it possible to easily drive the punches simultaneously, and, in particular, in synchronism, in order to be able to punch the workpiece at the same time at two locations which are separated from each other by the same distance as the punches. In machines having a numerical control of all functions, this offers a variety of possibilities increasing with the increasing number of tool carriers.

In FIG. 1, a switch box 75 is diagrammatically indicated, with which the entire change operation, the motion of metal sheet 4, as well as the coupling and uncoupling of the punches are controlled. The control is numerical, for example, through a punched tape. It is designed in a manner such that by dialing the corresponding tool station, the distance 42 between the tool carrier of the presently working tool and the tool carrier of the next tool to be used is automatically taken into account. Thus, while preparing the program, it is sufficient to consider which of the respective tool carriers is to be used for stamping at that time.

The corresponding change of the positioning path is then automatically correctly adjusted by the control device, and both the spacing 42 of the punches and the spacing of the one stamping location on sheet 4 from the next provided stamping location is taken into account. With the aid of this control, a temporary simultaneous stamping with two or more tools may also be provided. This possibility given by the invention machine tool is somewhat limited in practice, because of the fixed dimension 42.

While specific embodiments of the invention have been shown and described in detail to illustrate the application of the principles of the invention, it will be understood that the invention may be embodied otherwise without departing from such principles.

What is claimed is:

1. A machine having a reciprocating tool, comprising a drive motor having a continuously operable drive shaft, a plurality of reciprocating rams, a tool associated with each ram and mounted for movement at fixed individual locations and each being connectable to an associated ram for reciprocation therewith, a connection drive between said drive shaft and said rams for selectively driving each of said rams to cause the selective reciprocation thereof and to permit stopping of said rams, means for clamping a workpiece in the path of movement of said tools, said connection drive including means for disconnecting the drive of at least one ram while the remaining rams are reciprocated, and tool change means disposed alongside said tools including a member movable into engagement with a tool which is not being reciprocated by said ram to withdraw it for removal and substitution by a new tool while the others are reciprocated.

2. A machine having a reciprocating tool, as claimed in claim 1, wherein said tool change means includes a tool magazine conveyor having a plurality of tools thereon, said tool change means including a tool engagement member movable through a path to position a tool into alignment with said connection drive, said conveyor being movable to position a selected tool in alignment with said tool engagement member.

3. A machine having a reciprocating tool, as claimed in claim 2, wherein said tool engagement member comprises a cylinder, a piston having a piston rod portion being movable in said cylinder, said rod portion having means engageable with a tool for removing it from said conveyor and positioning it into association with said connection drive.

4. A machine having a reciprocating tool, as claimed in claim 1, wherein said machine comprises a stamping machine having a dye holder guide positioned below the workpiece and a punch positionable above said workpiece for cooperation with said dye, said connection drive being connected to said punch for reciprocating said punch, said tool change means including a conveyor having a plurality of tool holding cassettes thereon at spaced locations, said conveyor being alignable selectively with the holders in said machine for said dye and said tool punch, and including a reciprocating piston mounted adjacent said conveyor being engageable with a cassette on said conveyor to move the cassette with the tools thereon into association with said holders.

5. A machine, particularly a stamping or nibbling machine, which is capable of being operated selectively and alternatively with a plurality of different tools which may be interchanged without stopping the machine, comprising a support frame, a reciprocating tool drive mounted on said frame, a plurality of movable tools connected to said drive mounted on said frame at fixed spaced locations in position for selective reciprocation by said tool drive and for selective stopping and change purposes of at least one of said tools, coupling means connected between said tool drive and said tools for selectively connecting and disconnecting said tools from said tool drive for respectively moving and stopping said tools, a tool change member mounted alongside said tool drive and movable transversely to said tool drive for engaging and removing a tool therefrom which is stopped in order to effect a change of said tool with another tool, said reciprocating drive including at least two reciprocating members, one of said members being reciprocatable with a tool while the other of said reciprocating members being stopped to exchange the tools and vice versa, a workpiece holder, and means for moving said workpiece holder in a plane disposed transversely to the path of reciprocating movement of said tool.

6. A machine, particularly a stamping or niblling machine, as claimed in claim 5, wherein said reciprocating tool drive includes a plurality of tool carriers mounted in spaced parallel relationship.

7. A machine, particularly a stamping or nibbling machine, as claimed in claim 5, wherein said reciprocating tool drive comprises a rotatable eccentric shaft, a common connecting member for all of said tools, and a coupling member disposed between said connecting member and said tools for selective stopping of said tools during rotation of said shaft.

8. A machine, particularly a stamping or nibbling machine, as claimed in claim 7, wherein said coupling comprises a hydraulic coupling device having a fluid transmission between said connecting member and said tool which may be selectively relieved to stop said tool.

9. A machine, particularly a stamping or nibbling machine, as claimed in claim 8, wherein said coupling device comprises a reciprocating piston portion connected to said connecting member, a fluid cylinder in which said piston is displaceable, a drive piston opposed to said piston in said cylinder and connected to a tool for moving said tool with the displacement of said drive piston and a fluid connection in said cylinder between said piston and said drive piston.

10. A machine, particularly a stamping or nibbling machine, as claimed in claim 8, wherein said hydraulic coupling device comprises a working cylinder, a working piston pivotally mounted on said connecting member and displaceable in said working cylinder, a drive piston connected to a tool and displaceable within said work cylinder in alignment with said working piston and a fluid control system connected to said cylinder for selectively pressurizing and relieving the space between said drive piston and said working piston for selectively driving and stopping the drive piston and tool.

11. A machine, particularly a stamping or nibbling machine, as claimed in claim 10, wherein said hydraulic control system includes a four-way valve having a transverse free passage which is selectively connectable to the space between said piston and drive piston and to a liquid supply tank and which is also communicable with the spaces between the associated work piston and drive piston and the respective opposite ends of said cylinder.

12. A machine, particularly a stamping or nibbling machine, as claimed in claim 5, including tool holders connected to said reciprocating tool drive and locking means associated with said holders for locking a tool therein which may be opened only when the associated drive is disconnected or stopped.

* * * * *